United States Patent
Le et al.

(10) Patent No.: US 8,595,814 B2
(45) Date of Patent: Nov. 26, 2013

(54) TLS ENCRYPTION IN A MANAGED E-MAIL SERVICE ENVIRONMENT

(75) Inventors: Binh Le, San Jose, CA (US); Erik Chen, San Carlos, CA (US); Michael J. Oswall, Berkeley, CA (US); Adam Dawes, San Carlos, CA (US); Joseph Green, San Francisco, CA (US); Kenneth K. Okumura, Sunnyvale, CA (US); Scott M. Petry, Palo Alto, CA (US); Lisa Lund, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1202 days.

(21) Appl. No.: 11/302,985

(22) Filed: Dec. 13, 2005

(65) Prior Publication Data
US 2007/0136801 A1 Jun. 14, 2007

(51) Int. Cl.
*H04L 29/06* (2006.01)

(52) U.S. Cl.
USPC ............ 726/10; 709/227; 380/255; 713/153; 713/168

(58) Field of Classification Search
USPC ................ 709/227, 228, 238, 230, 231, 206; 380/255; 713/150, 153–158, 168–170; 726/10
See application file for complete search history.

(56) References Cited

U.S. PATENT DOCUMENTS 6,851,053 B1 2/2005 Liles et al.
7,016,973 B1 * 3/2006 Sibal et al. ............ 709/238
2003/0105957 A1 6/2003 Brabson et al.
2003/0158905 A1 8/2003 Petry et al.
2003/0200267 A1 10/2003 Garrigues
2004/0039827 A1 2/2004 Thomas
2004/0054886 A1 3/2004 Dickinson et al.
2004/0133775 A1 7/2004 Callas et al.
2005/0249219 A1 11/2005 Bajko et al.

FOREIGN PATENT DOCUMENTS

EP 1189407 A 3/2002

OTHER PUBLICATIONS

Boncella, Robert J. "Web Security for E-Commerce." Communications of the AIS, vol. 4, Article 11, Nov. 11, 2000, pp. 1-43.
PCT/US06/61325, International Search Report and Written Opinion of International Searching Authority dated Mar. 19, 2008.
EP 06 846 392.6, Supplementary European Search Report dated Nov. 16, 2009.

* cited by examiner

*Primary Examiner* — Joseph P. Hirl
*Assistant Examiner* — John B King
(74) *Attorney, Agent, or Firm* — Birch, Stewart, Kolasch & Birch, LLP

(57) ABSTRACT

Disclosed are systems and methods for providing transport layer encryption with an intermediate electronic message managing service interposed in a message path of an electronic message to be sent from a sending server to an intended receiving server across a computer network. To implement TLS in such a managed e-mail services context, given that a managed e-mail service is inserted into the message delivery path, the transport layer security protocols are simultaneously established along both the link from the sending server to the managed e-mail service and from the receiving server to the managed e-mail service, with the managed e-mail service providing a "proxy" connection for communication between the sending server and the receiving server.

26 Claims, 6 Drawing Sheets

| COMMAND <argument> | COMMENT |
|---|---|
| S: EHLO <"sending server domain"> | THE SENDING SERVER REQUESTS A CONNECTION |
| R: 250 <"receiving server domain"> | THE RECEIVING SERVER ACCEPTS THE CONNECTION |
| R: 250 STARTTLS | THE RECEIVING SERVER INFORMS THE SENDING SERVER THAT IT CAN COMMUNICATE VIA TLS |
| S: STARTTLS | THE SENDING SERVER AGREES TO COMMUNICATE VIA TLS |
| R: 220 READY | THE RECEIVING SERVER IS READY TO RECEIVE TLS COMMUNICATION |
| ... THE SENDER AND RECEIVER FIRST USE AN ASYMMETRIC ENCRYPTION KEY AND THEN A SYMMETRIC, SESSION KEY TO ESTABLISH A SECURE COMMUNICATION CHANNEL BETWEEN THEM. THE FOLLOWING SMTP CONNECTION COMMANDS ARE THEN EXCHANGED IN AN ENCRYPTED FASHION ||
| S: MAIL FROM: <"sender name"> | THE SENDING SERVER REPORTS THE NAME OF THE SENDER |
| R: 250 OK | THE RECEIVING SERVER ACKNOWLEDGES THE SENDER NAME |
| S: RCPT TO: <"recipient name"> | THE RECEIVING SERVER REPORTS THE NAME OF THE RECIPIENT |
| R: 250 OK | THE RECEIVING SERVER ACKNOWLEDGES THE RECIPIENT NAME |
| THE SENDING SERVER AND RECEIVING SERVERS EXCHANGE DATA BETWEEN THEM ACCORDING TO THE SMTP PROTOCOL (UNDER AN ENCRYPTED SESSION AS ESTABLISHED ABOVE) ||

*FIG. 2*

TLS ENCRYPTION IN A MANAGED E-MAIL SERVICE ENVIRONMENT

TECHNICAL FIELD

Disclosed embodiments relate generally to electronic message encryption, and more particularly to implementations of Transport Layer Security encryption in a managed e-mail service environment.

BACKGROUND

The protocol for delivery of e-mail over the Internet is the Simple Mail Transport Protocol (SMTP). The specifics for these types of communications—as with other Internet protocols—are established through a Request For Comment [RFC] procedure, where the applicable RFC number for normal e-mail communications today is RFC-821, which essentially establishes the de facto protocols by which servers and clients send e-mail communications "in the clear" or unencrypted over the Internet. In many cases, these unencrypted communications go through one or more routers that are not controlled or trusted by either the sender or recipient of e-mail. Such an untrusted router might allow a third party to monitor or alter the communications between the server and clients, thereby compromising security.

There is often a desire, therefore, for two SMTP agents to be able to authenticate each other's identity. For example, a secure SMTP server might only allow communications from other SMTP agents it knows, or it might act differently for messages received from an agent it knows than from one it doesn't know.

Encryption is becoming increasingly important to corporate users, particularly in industries that regularly exchange confidential information via the Internet, such as health care, legal and financial services. Transport Layer Security ("TLS") is an encryption standard designed to secure data where it is most vulnerable, in transit over the public Internet. As its name implies, TLS operates at the OSI (Open Systems Interconnect) Transport Layer. Operating at the transport layer, the standard is accordingly independent of the application protocol, and provides server authentication with optional client authentication.

The TLS encryption standard uses a key exchange protocol, such as an RSA (Rivest-Shamir-Adleman) asymmetric key system to establish a transport layer session. Another example of a key exchange protocol found in conventional systems is the Diffie-Hellman protocol. Upon establishing the transport layer session, the standard thereafter uses symmetric key encryption techniques, such as, for example, the IDEA (International Data Encryption Algorithm), DES (Data Encryptions Standard), and 3DES (Triple-DES) standards.

The TLS protocol exchanges records, and each record can be optionally compressed, encrypted and packed with a Message Authentication Code (MAC). Each record has a content_type field that specifies which upper level protocol is being used. When the connection starts, the record level encapsulates another protocol, the handshake protocol, which has content_type 22. The client sends and receives several handshake structures to and from the server. The client sends a "ClientHello" message, specifying the list of cipher suites, compression methods, and the highest protocol version it supports. The client also sends random bytes, which will be used later. The server then returns a "ServerHello," in which it selects the connection parameters from among the choices offered by the client. Once these connection parameters are agreed upon as described above, the client and server exchange certificates using the selected public key cipher.

Encryption is a part of the task, but in particular, the sender is also concerned with validating the certificate of the receiver to ensure that no unauthorized receiver is enabled to receive the sender's e-mail communications.

SUMMARY

To implement TLS in a managed e-mail services context, given that a managed e-mail service is inserted into the message delivery path, the transport layer security protocols are simultaneously established along both the link from the sending server to the managed e-mail service and from the receiving server to the managed e-mail service, with the managed e-mail service providing a "proxy" connection for communication between the sending server and the receiving server.

In general upon receiving a request to initiate an SMTP session, the managing service employing TLS encryption will handshake with the sending server, determine the receiving server for the requested SMTP session, and applies the security policies of the respective servers, for example, with an emphasis in particular on the security policy of the sending server if the managing service is employed in an outbound context with a mail server operating in a sending capacity. Depending on the result of the policy analysis, the mail managing service would then initiate its handshake with the receiving server while maintaining its original connection with the sending server. The security policies are employed to authenticate the sending and receiving servers (e.g., with a Registration Authority (RA)).

More than one root-level RA may be used by the managed e-mail service to validate the sending and receiving server certificates, ensuring that the respective certificates are valid and have not expired or been revoked, such as through the Online Certificate Status Protocol (OCSP) checking the certificates against the Certificate Revocation List (CRL). The embodiments described herein can be used in a managed email service to implement TLS security in managed email services as described in commonly assigned U.S. Pat. No. 6,650,890, which is hereby incorporated by reference herein. As another possible embodiment, the above encryption protocols are further built upon a system in which incoming SMTP connections are analyzed according to real-time sender-based metadata, such as described in commonly assigned U.S. Pat. No. 6,941,348 and U.S. patent application Ser. No. 11/137,110, which are hereby incorporated by reference herein.

The encryption process may be implemented in a way that is substantially transparent to end-users, and may permit continued inspection and filtering against spam, viruses and policy violations while preserving management and control for e-mail administrators. In certain embodiments, administrative tools are used to enable centralized enforcement of encryption policies across the enterprise, right down to individual users. For example, users can select security levels for e-mail shared between specific users, servers, groups, organizations, etc., and set encryption policies regarding electronic messages from other companies and domains. Error handling, alternate disposition, and reporting capabilities may be used to extend users' or organizations' control over how encryption is managed.

BRIEF DESCRIPTION OF THE DRAWINGS

For a more complete understanding of the principles disclosure herein, and the advantages thereof, reference is now made to the following descriptions taken in conjunction with the accompanying drawings, in which:

FIG. 2 illustrates a table showing the commands employed in a TLS encryption system;

DETAILED DESCRIPTION

Figure 1A:
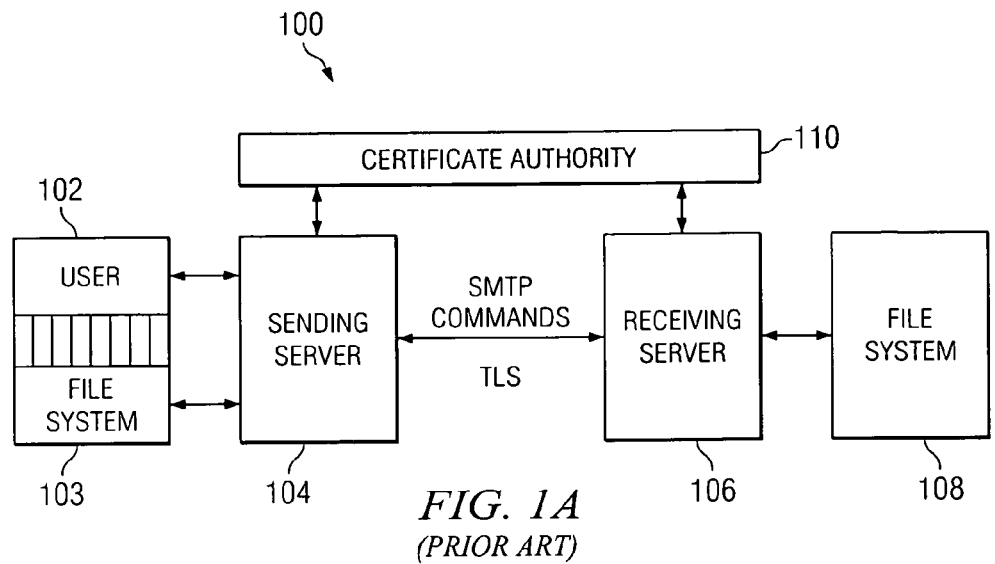
FIG. 1A illustrates a block diagram of a prior-art TLS encryption system implemented between sending and receiving e-mail servers.

FIG. 1A is a block diagram illustration of a prior-art Transport Level Security (TLS) implementation 100 where the TLS session is incorporated in a Simple Mail Transport Protocol (SMTP) session directly between a sending server 104 and a receiving server 106. The sending server 104 sends the communications on behalf of a user 102, and is supported by the file system 103. The receiving server 106 is further operable to store messages on the file system 108. The encryption is performed at the "Transport Level" as illustrated by the network level diagram of FIG. 1B, which shows the corresponding available network level communications that are available in the corresponding blocks of FIG. 1A. Thus, the sending and receiving servers 104, 106 initiate the transport level message transfers through the SMTP session, and are also responsible at the same time for establishing a TLS session under which the SMTP messages will be transported. As shown, the SMTP commands are sent between the two servers 104, 106, and the TLS session is also implemented between these two servers at the transport level by exchanging similar commands, and also through verifying each other's certificates through the certificate authority 110.

Figure 1B:
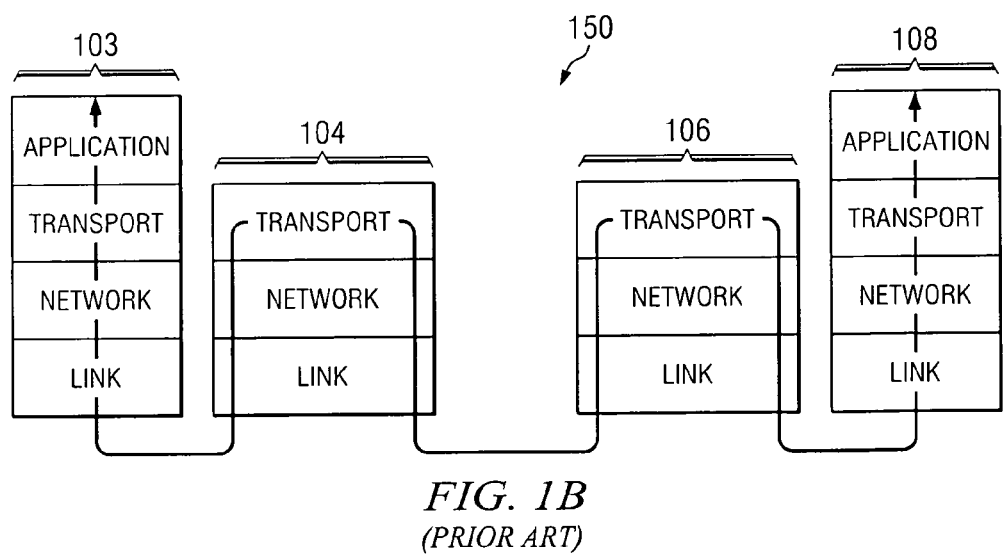
FIG. 1B illustrates a network-level illustration of the hierarchical layers employed in communicating between the system elements illustrated in FIG. 1A.

As mentioned, FIG. 1B illustrates the network level communications available for communication between the network elements. For TCP/IP communications between the sending server 104 and the receiving server 106, the primary mechanism for assuring these communications is that of transport-layer communications. SMTP is a transport-layer communications method for communicating between network elements on the Internet, and in particular between Message Transport Agents (MTAs). Although the user-level systems also communicate with the servers at the transport level (running under the user's application-level software, as shown), the particular transport-layer protocol may not be the language of SMTP-level communication, and instead may be a client/server communication protocol, such as POP3 or IMAP. By implementing encryption at the transport layer between responsible servers 104, 106, however, TLS encryption provides for secure communication that is transparent to the end-user.

FIG. 2 is a command table 200 for communications between two servers implementing TLS between sending and receiving servers 104, 106, such as those shown in FIG. 1A. The command table 200 has two columns—the first column sets forth the SMTP and TLS commands 202, whereas the second column provides brief explanatory comments 204. Other comments 206 are also set forth in the table 200, where these other comments 206 provide a description of sets of steps that are not specifically set forth in the table 200.

Still referring to FIG. 2, a connection is first initiated through the two servers 104, 106 by sending the "EHLO" command from the sending server 104 (commands denoted by "S:" in Table 200) and by the "250" or "EHLO" command. By this, the receiving server 106 (commands denoted by "R:" in Table 200) has only accepted connection, but it has not agreed to necessarily accept the e-mail communication. In the presently described TLS encryption in a mail-managed system, the mail managing service is operating as a proxy for a receiving server when communicating with a sending server, and operating as a proxy for a sending server when communicating with a receiving server, generally employs these same commands in its communications, as will be further described in greater detail below. As such, the EHLO command of the sending server 104 requesting the connection is answered by the mail managing service (by proxy) such that the managing service accepts the connection from the sending server 104. Likewise, the managing service relays the EHLO command to the receiving server 106, and if accepted (i.e., the receiving server 106 sends back the "250" command, which is intercepted by the managed service), a second, simultaneous connection is made between the managed service and the receiving server 106. However, as mentioned above, these proxy connections with the managed service are transparent to the sending and receiving servers 104, 106, and thus to the end-users.

In a prior-art system implementing TLS encryption, as shown in FIGS. 1A-1B, the servers 104, 106 can directly initiate the TLS session by the receiving server 106 sending a "250 STARTTLS" command. This command informs the sending server 104 that the receiving server 106 can communicated using TLS encryption. The sending server 104 then requests to communicate via TLS by sending a "STARTTLS" command, and the receiving server 106 communicates that it is ready to start communicating using TLS encryption by responding with a "220 READY" command. As illustrated in the first block 206, the sending and receiving servers 104, 106, having agreed to communicate via TLS, now set about establishing the TLS protocol that they will use. They establish an initial connection through authorization and certificate exchange whereby the public keys of the servers 104, 106 are exchanged. Using the public and private keys of the servers 104, 106, the servers 104, 106 thereby initiate an asymmetric encrypted connection. Once the servers 104, 106 have established their common asymmetric encrypted connection, they then can proceed to agree upon a symmetric data communication technique—still further according to the general block 206.

Figures 3A, 3B:
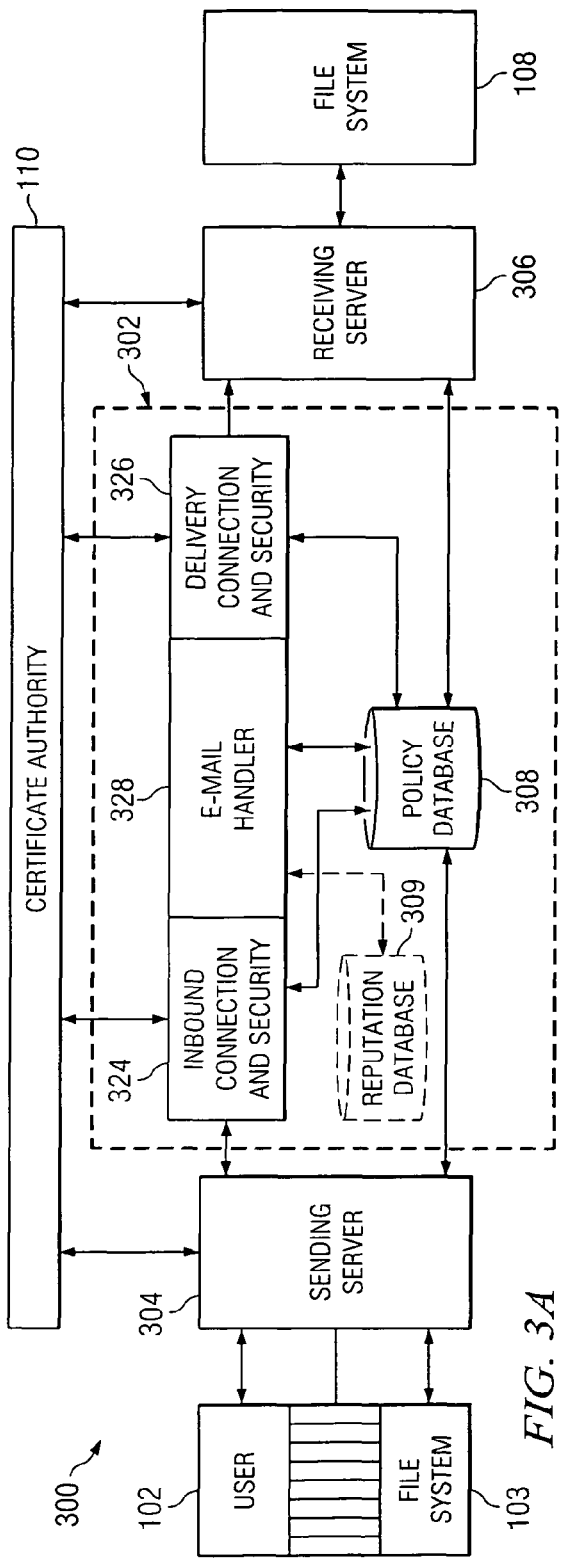
FIG. 3A illustrates a block diagram of an embodiment in which a managed e-mail service is provided between a sending server and a receiving server in accordance with the disclosed principles.
FIG. 3B illustrates a network-level illustration of the hierarchical layers employed in communicating between the system elements illustrated in FIG. 3A.

According to the further SMTP commands, the sending server 104 and the receiving server 106 can then exchange their names with each other using the encrypted channel, and can then exchange data between themselves according to the SMTP message transfer protocol operating under the encrypted session established between them as described above. As mentioned above, these same commands are generally implemented in a managed TLS service in communications among a sending server 304, receiving server 306, and managed (intermediate) service 302 operating as an proxy as further described in connection with FIG. 4A, below and having an exemplary architecture as illustrated in FIG. 3A and discussed below. As such, the entire set of commands and dialogue exchange between the sending and receiving servers passes through the intermediate, interposed mail managing service. This is accomplished by the managing service simultaneously initiating and maintaining connections on both sides (i.e., symmetrical), rather than the typical asymmetrical initiation that occurs in conventional systems. Once again, however, the interposed proxy function of the managed service remains transparent to the servers and to the end-users so as not to require reconfiguration of either server to provide TLS encryption in the presently disclosed manner.

FIG. 3A is a block diagram of an embodiment of TLS implementation 300 according to the disclosed principles. Specifically, this implementation 300 includes a managed e-mail service 302 interposed between a sending server 304 and a receiving server 306, and also illustrates the connection between those servers 304, 306 and their users. Generally, the managing service 302 shown in FIG. 3A handles e-mail (or other electronic messages or communications) between sending mail servers 304 and receiving mail servers 306. The designation of one mail server as a "sender" and the other as a "receiver" is arbitrary. Practically speaking, servers will act as both senders and receivers of electronic messages from and to other servers. The managing service 302 is operable to establish and manage connections in both directions simultaneously, as it acts as a proxy in its communications in both directions.

The managing service 302 may be further configured to interpret conditions, analyze traffic patterns, and manage the delivery of message data to the receiving server 306 according to the customer's policies as set forth in an associated policy database 308, and according to the principles disclosed in U.S. Pat. No. 6,941,348 and U.S. patent application Ser. No. 11/137,110, which are specifically incorporated by reference herein for their teaching of interpreting traffic conditions and analyzing traffic patterns of sending mail servers 304, and managing the delivery of message data to receiving servers 306 in accordance with the principles described therein.

Further, because the managing service 302 simultaneously establishes connections in both directions while acting as a proxy for both end servers in the communication path, it is able to provide a greatly increased level of functionality relative to prior systems. In particular, in its role as a proxy, the managing service 302 breaks down the TLS encrypted packets, and accordingly is able to provide additional message management services for such things as end-user encryption (application-level encryption, such as PGP, S/MIME (based on RSA's public-key encryption technology), Voltage (Identity-based encryption technology), etc., spam and virus filtering, and content management. Further details of the managed email services that can be used to advantage with the TLS encryption approach in the present disclosure are described in commonly assigned U.S. Pat. Nos. 6,650,890 and 6,941,348, and in U.S. patent application Ser. No. 11/137,110, referenced above. Moreover, as used herein, the managing service 302 "simultaneously" establishing symmetrical connections with a sending and receiver server may, in practice, actually be substantially simultaneously. More specifically, there is typically a bit of "stagger" in establishing the symmetrical connections, for example, the managing service 302 first establishing the connection with the sending server before immediately thereafter establishing the connection with the receiving server. Thus, while the connections are maintained simultaneously by the managing service 302, establishment of the connections may actually occur sequentially, although still immediate enough so that any delay or stagger is not noticeable to end users.

The managing service 302 performs its processing steps as incoming SMTP connection requests are received, whereby the managing service 302 acts as a proxy for the receiving server 306 and passes through the received e-mails (unless the connection is refused or the e-mails are quarantined or alternatively disposed of) without delay. In contrast, traditional e-mail servers and other managed-service approaches will typically accept the message data and write the message to disk prior to performing analysis (e.g., a "store-and-forward" process).

In the embodiment shown, the MX record associated with the customer server's 306 domain name will be associated in the DNS distributed database (not shown) with the IP address of the managing service 302 such that e-mail directed to the customer server 106 from the sending server 104 will be routed instead to the managing service 302. The managing service 302 is shown in FIG. 3A as including several interconnected message handling software modules 324, 326, 328 for processing electronic messages, and the operation of these message handling software modules is described in detail below. The layout of these various software modules is not indicative of any particular physical structure in the machine running these software modules.

With more specific reference to the exemplary software modules illustrated in FIG. 3A, illustrated is an inbound connection & security module 324, which may be simply referred to in this disclosure as an inbound connection manager 324. The inbound connection manager 324 is responsible for setting up and monitoring incoming SMTP connections from sending servers 304, typically via Mail Transfer Agents, which are the multiple servers of the Internet cloud (not shown) via which the e-mail is routed. The inbound connection manager 324 is the entry point to the managing service 302 from the outside world, and it monitors the incoming SMTP connection attempts, as well as incoming e-mail messages. In this general embodiment, the inbound connection manager 324 is also responsible for establishing the TLS encrypted session with the sending server 304, including by authenticating the sending server 304 with the Certificate Authority 110. As used herein, "authenticating a server" actually involves authenticating a certificate or other type of identifying item associated with and presented by the server being "authenticated." Thus, as the term "authenticating" is used throughout this disclosure, it is understood by those skilled in the art that it is actually the source or identity of the server that is being authenticated as opposed to authenticating the piece of equipment being operated.

Still referring to the inbound e-mail delivery, also provided for handling this inbound mail is an inbound delivery & security module 326, which may be simply referred to as an inbound delivery manager 326. The inbound delivery manager 326 is the exit point from the managing service 302 to the receiving server 306, and it establishes a delivery path to the receiving server 306. In this general embodiment, the inbound delivery manager 326 is also responsible for establishing the TLS encrypted session with the receiving server 306, including by authenticating the receiving server 306 with the certificate authority 110. As discussed above, establishing connections with the sending and receiving servers 304, 306, as well as establishing the TLS encryption session, is done by the managing service 302 such that the typical commands (and accompanying responses) are still used in communicating with the sending and receiving servers 304, 306, but these commands are instead exchanged with the managing service 302 operating in its proxy role. Although consistent with the managing service 302 operating as a proxy, neither the sending server 304 nor the receiving server 306 would operate any differently than if they were communicating directly with each other. In effect, the managing service 302 is transparent to the sending and receiving servers 304, 306.

Between the connection manager 324 and delivery manager 326 is an e-mail handler 328, which can apply various added services, such as virus scanning and checking of content of e-mail for spam characteristics or other bases for filtering inbound or outbound messages. A description of possible value-added services that can be implemented by the e-mail service is further described in the above-identified U.S. Pat. No. 6,650,890.

On the outbound side, e.g., when the managing service 302 is affiliated with a customer's sending server 304 to monitor outbound electronic messages, the delivery manager 326 may also include modules to perform the important task of ensuring outbound e-mail encryption and policy compliance. This is particularly important when the customer of the managing service 302 wants its outgoing e-mails to not contain sensitive information or other content that is intended for either internal use only or only for certain recipients. This outbound function of the delivery manager 326 can perform the exemplary functions of enforcing the policy compliance of the customer and, as a part of that, to check the content, attachments, and addressees of outbound messages. In this context, the "inbound connection and security" module 324 is really serving to authenticate the customer sending server 304, but not really as an "inbound" connection in the sense described above. At any rate, this module 324 still effectively serves to authenticate and enforce policies on the communication between the customer sending server 304 and the managing service 302.

Other functionality that is illustrated as being associated with the connection and security modules 324, 326 is that of interfacing with the certificate authority 110 to authenticate the sending and receiving servers 304, 306 through the certificate authority 110, as shown.

Alternative dispositions (other than delivery) of inbound or outbound messages provided by the managing service 302 can be implemented if security policies are not complied with (e.g., server authentication, sender or receiver restrictions, level of encryption, or message filtering criteria). Alternative dispositions can include some of the exemplary dispositions set forth in Table 1. In particular, one type of message redirection would include the sending of messages that violate security policies to an administrator for review of the particular message to determine whether any corrective actions should be taken against the activity or particular users. Moreover, one or more of these alternative dispositions may be accompanied by a notification message sent to the customer (e.g., the intended recipient of the disposed of message), an administrator (e.g., associated with the managing service 302 or with the receiver's system), or both.

TABLE 1

Alternative Dispositions message accept;
message reject (bounce);
message quarantine;
message redirect; and
connection rejection.

This system as implemented in FIG. 3A relies on the managing service 302 to establish, as through RFC 3207, separate, secure, and simultaneous SMTP connections both to a sending server 304 and a receiving server 306, where at least one of those two servers would be associated with a customer of the mail managing service 302. TLS is a flexible service to employ in this context as it is supported by predominant mail servers, such as Exchange, Domino, Postfix, Sendmail, and QMail. In the establishing of these connections, certificates are used to authenticate the identities of the respective servers at both ends of the route established by the managing service 302.

For the authentication process, for example, an X.509 certificate associates a server's public key with its identity. The certificates are obtained from and managed by the Certificate Authority (CA) 110. In establishing the connections, the certificates are then verified by an RA, as described above. Using these techniques, a sending server 304 will validate through the RA the certificate of the receiving server 306 to ensure against confidential outgoing mail being sent to a hacker or other malicious party. But as implemented here, it is not only the receiving server 306 that can be authenticated, but also the sending server 304 to guard against the setting up of unwanted TLS-encrypted SMTP communications. The specific requirements for establishing a connection can be determined according to customer policies that are stored as a customer profile within the managing service 302 (e.g., the policy database 308). Certain types of communication, mail from certain groups of users, or other types of policy criteria can be applied in determining whether to allow unencrypted e-mail to pass if the servers are not able to be authenticated by the managing service 302, or are otherwise unable to agree upon encryption parameters. Other alternative dispositions can be provided for according to the security policies, such as providing communications to a secure user-accessible website and sending a notification of the storing of presumably valid e-mails at a website.

In effect, in certain described embodiments the managing service 302 will: handshake with the sending server 304; if possible, validate its certificate through an RA; determine the intended destination server 306; apply policies; handshake with the destination server 306; and validate the destination server's 306 certificate through an RA. As mentioned above, more than one Root Level RA may validate the relevant certificates.

The managing service 302 described herein implements the TLS implementation as a part of the managed e-mail flow, and may do so in both inbound and outbound contexts. In the event that the TLS connection cannot be confirmed between the sending server 304 and receiving server 306, the following are possible exemplary dispositions: downgrade to transaction in clear text (unencrypted); reject connection with bounce to sender; and otherwise dispose of in accordance with Table 1. In all cases, it is further possible to configure a "notification" to a sender, an intended recipient, and/or an administrator of the implementation of the alternative disposition. Thus, described embodiments of the managing service 302 are operable to support negotiation outcomes, such as when one of the servers does not support TLS, a certificate cannot be validated or has been revoked, authentication fails or otherwise cannot be established.

Starting with the assumptions that the sending and receiving servers 304, 306 both have ports available, a TLS SMTP connection in accordance with the disclosed principles is established and described with reference to FIG. 3B. FIG. 3B depicts a network-level illustration 350 of the hierarchical layers employed in communicating between the system elements illustrated in FIG. 3A.

Once again, the encryption is performed at the "Transport Level" as illustrated by the network level diagram of FIG. 3B, which shows the corresponding available network level communications that are available in the corresponding blocks of FIG. 3A. Thus, the sending and receiving servers 304, 306 initiate the transport level message transfers through the SMTP, and are also responsible at the same time for establishing a TLS session under which the SMTP messages will be transported. In contrast to conventional TLS encryption processes, the SMTP commands are no longer sent directly between the two servers 304, 306. Instead, as described in detail above, a symmetrical process is provided where an SMTP connection request is made between the servers 304, 306 with the managing service 302 acting as proxy between the two.

After a first TLS session has been accepted from the sending server 304 by the managing service 302, assuming the appropriate security policies have been met, a second TLS session is simultaneously implemented between the mail service 302 and the receiving server 306 to which the electronic message has been addressed. These security policies are typically authenticating the identity of the sending server 304 (e.g., again using the policy database 308), and may include satisfying the message filtering criteria managed by the managing service 302. The second TLS session typically includes the managing service 302 initiating an SMTP connection with the receiving server 306. Even though two distinct layers of encryption at the transport layer are provided between the sending server 304 and the managing service 302, and then between the managing service 302 and the receiving server 306, TLS encryption in accordance with the disclosed principles still provides for secure communication that is transparent to the end-users.

Figure 4A:
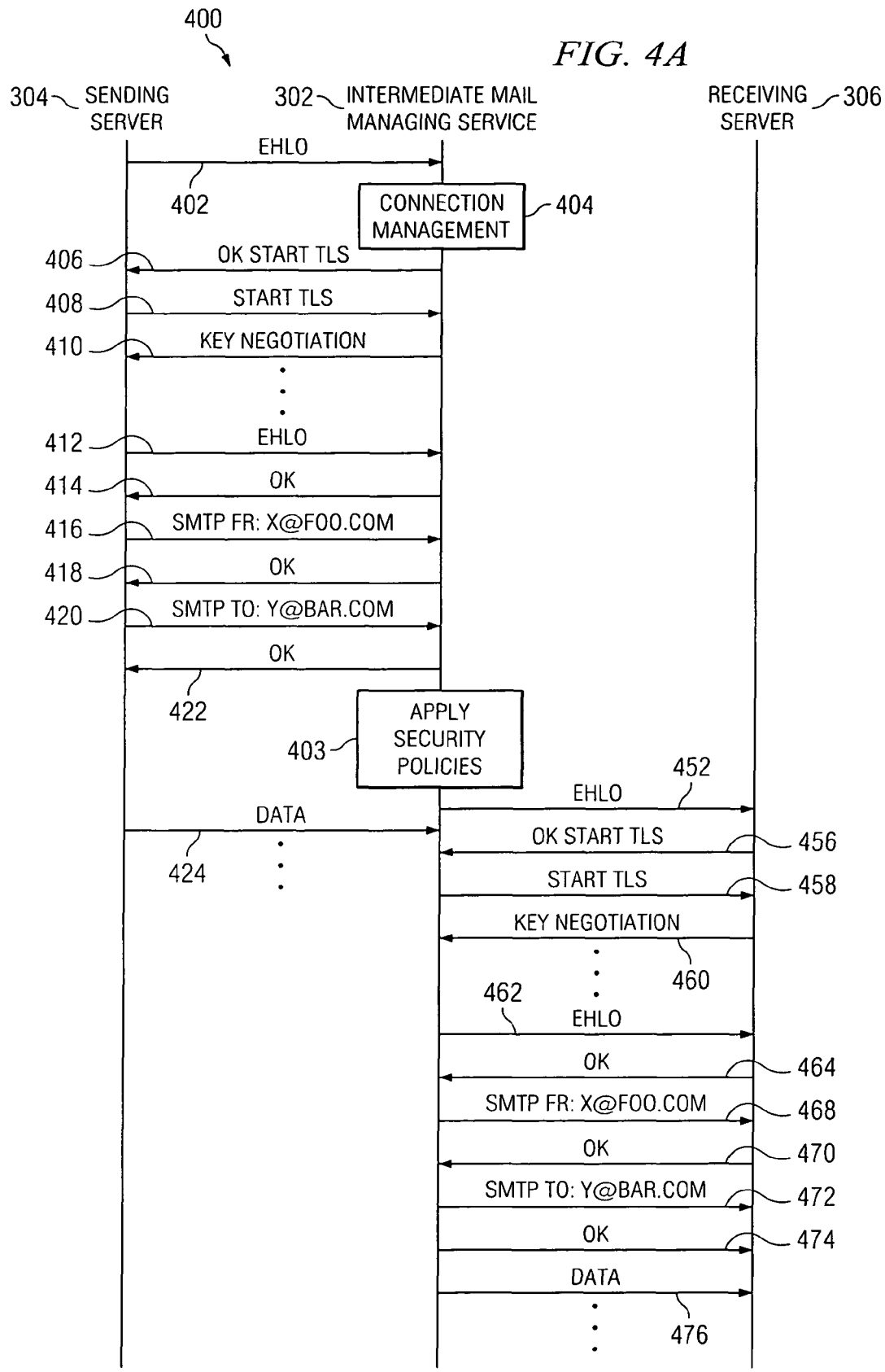
FIG. 4A illustrates a flow diagram of SMTP communications implemented in a managed email service with TLS encryption.

FIG. 4A illustrates an exemplary flow diagram 400 for the establishing of simultaneous TLS sessions with the mail managing service 302 acting as the intermediate service by having simultaneous connections with both a sending and a receiving server 304, 306. The TLS instructions/commands used here are consistent with those set forth in FIG. 2 and its accompanying textual description. While this disclosure describes "TLS" as the encryption method, it is anticipated that the inventions described herein will apply to other contexts—both general and specific—according to the scope of the claims that any ultimate patents issuing herefrom contain. Thus, the claims should not be limited according to the specifically described embodiments of this specification.

Still referring to FIG. 4A, at 402 a sending server 304 will attempt to initiate a higher-level SMTP session by sending a "EHLO," which stands for "Extended HELO," differentiating the session initiation of traditional SMTP communications by the "Extended" descriptor. In the presently described managing service 302, before even continuing with the connection, a possible embodiment using "connection management" 404 comprises using traffic analysis methods as set forth in the above-identified U.S. Pat. No. 6,941,348 to reject connection attempts from senders whose characteristics might make them undesirable as senders through the managing service 302.

If the connection request passes "connection management" 404 (if implemented), then the managing service 302 can continue the dialogue with the sending server 304 by sending an "OK STARTTLS" command 406. The sending server 304 will then provide a return acknowledgment through its own "STARTTLS" command 408, upon which a key negotiation can begin between the managing service 302 and the sending mail server 304. Thus, at 410 a broadly named "key negotiation" occurs, although this is not an explicit SMTP command but a general category of commands that will be further described with respect to FIG. 4B.

Still referring to FIG. 4A, with another EHLO command 412, this time sent encrypted according to the above-referenced key negotiation 410, the sending server 304 continues the dialogue. The managing service 302 responds "OK" 414, whereupon the sending server 304 sends envelope information, beginning with "SMTP FR: x@foo.com" 416 where x@foo.com is the identification of the sender name in this exemplary embodiment. The managing service 302 again responds "OK" 418. The sending server 304 then continues with the envelope information "SMTP TO: y@bar.com" 420 (again, in this exemplary embodiment), and the managing service 302 again acknowledges receipt by sending "OK" 422.

Knowing now the identified sender and recipient of the electronic message traffic, the managing service 302 can apply known security policies of the sender 304 and/or recipient 306 according to the identified analysis block 403. According to the security policy analysis 403, the managing service 302 can establish its proxy security service between the sending email server 304 and the receiving email server 306. These policies can be applied based on domains, users, content, or other possible security bases.

Upon satisfaction of the respective security policies 403, the managed email service 302 begins negotiating the SMTP (TLS) connection with the receiving server 306 while keeping the SMTP (TLS) connection open with the sending server. Commands 452-474 identify the same commands which are used in a similar way as those described above for the SMTP connection between the sending server 304 and the managing service 302. With established TLS SMTP connections between the managing service 302 and the sending and receiving servers 304, 306 respectively, message data is then preferably exchanged according to "DATA" commands 424, 476.

According to the described approach, the data is sent in a symmetric encrypted form according to negotiated symmetric keys. At the managing service 302, the data is decrypted and this is "in the clear" for e-mail management that can occur at the managing service 302. Such e-mail management can include compliance management, traffic management, email forwarding, archiving, and many other types of e-mail management services.

The above commands are merely exemplary, and it is intended that the managing service 302 be responsive to negotiated security techniques (either between private parties or according to industry groups) to receive requests for secure communications and to act as a proxy for those communications. Even within particular approaches, there may be multiple approaches for entering into such communications, and the system described here is intended to cover such multiple approaches.

Figure 4B:
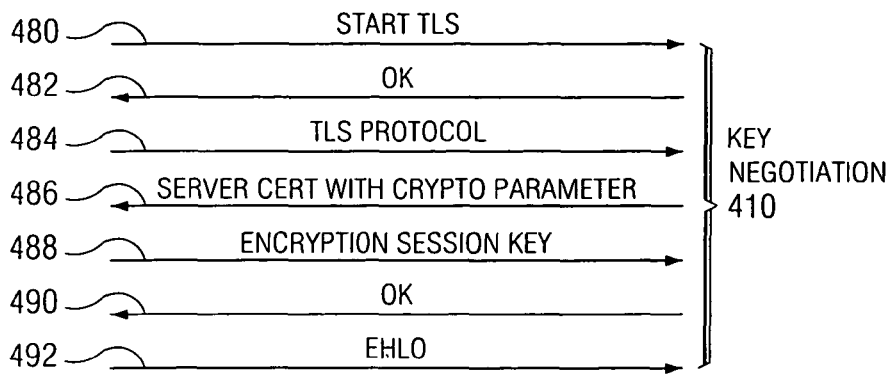
FIG. 4B illustrates a flow diagram showing the "key negotiation" of FIG. 4A in greater detail.

Referring now to FIG. 4B, the key negotiation protocol 410 as referenced above with respect to FIG. 4A is described in additional detail. This key negotiation 410 includes the "STARTTLS" command 480 and an acknowledgement from the managing service 302 or the receiving server 306, depending on whether the session is being established between the sender 304 and the managing service 302 or the managing service 302 and the receiving server 306.

Still referring to FIG. 4B, the TLS protocol to be used and applicable parameters are set forth according to command 484, and server certificate information and crypto parameters are send back with command 486. An encryption session key is then sent through command 488, which is then acknowledged with OK 490, and the handshaking is completed with an "EHLO" command 492. According to the system described herein, the encryption and/or authentication parameters exchanged and agreed-upon here can be used within the policy determination. In accordance with this approach, for example, there are certain levels or modes of TLS encryption. The policy of the sender and/or recipient might be to exchange encrypted data at a certain level. The policy defined might also specify alternative dispositions if the recipient and/or sender cannot comply. Similarly, there are different certificate levels—T1, TX, self-cert—that may be accepted or rejected according to policies of senders or receivers. With all of the described implementations herein, the mail managing service 302 is able to facilitate the application of the security policies by the information stored in its policy database 308 (see FIG. 3A). Specifically, the policy database 308 can specify on a by-domain, by-server, or even by-user basis the levels of encryption or certificate authentication that is required. The policy database 308 can store alternative dispositions to be used under varying conditions and with different users, and it can provide content—based policy restrictions, encryption levels, and alternative dispositions, with the flexibility of defining all of these items according to users, servers, domains, or other criteria.

Figure 5:
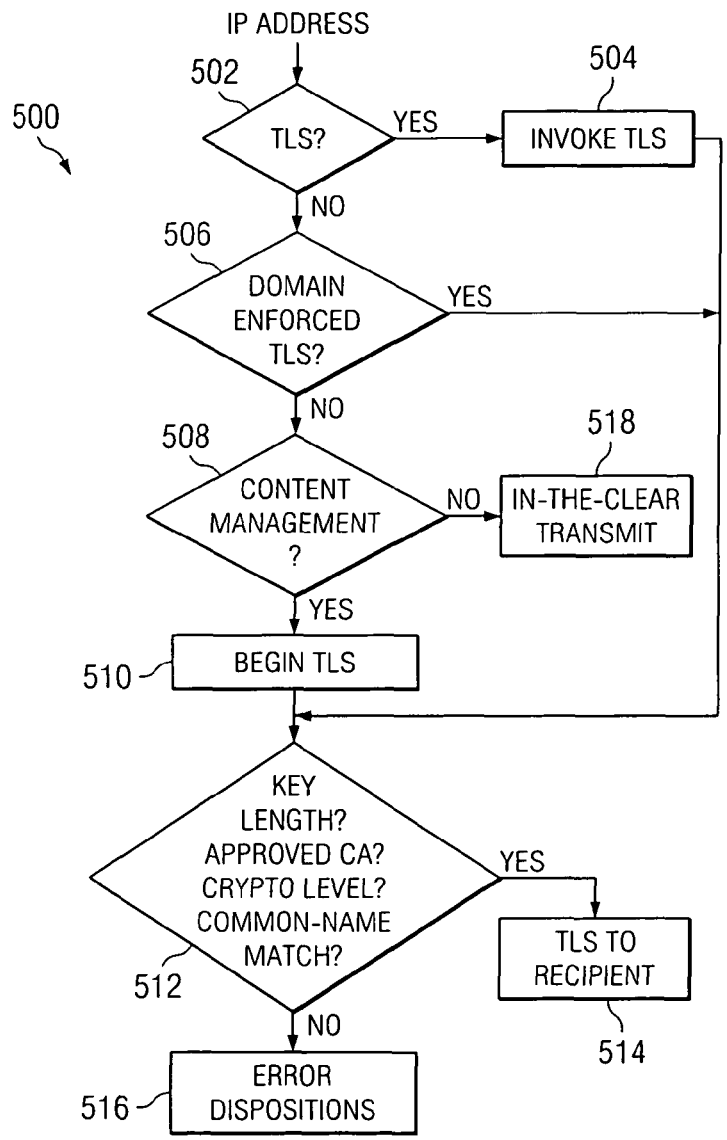
FIG. 5 is an exemplary flow diagram of TLS management according to the teachings of the present application in which email is "outbound" from a customer's "sending server" through a managed email service.

FIG. 5 shows a flowchart 500 of the application of the above-described security and policy decisions for communications that are coming from a sending server 304 that belongs to a customer of the managing service 302. According to decision block 502, a first exemplary step is to examine the IP address that the message is coming from. This is important to keep unwanted senders from "hijacking" a connection in order to use the customer's bandwidth or damage the customer's reputation. If TLS has already been implemented at block 502 according to any concerns based on IP address, block 504 illustrates that "invoking" of TLS. From there the process would proceed to confirming TLS encryption at acceptable levels according to the various security policies of the sender and/or receiver at block 512, such as proper TLS format or generation, sufficient encryption key length, Certificate Authority (CA) level, sufficient crypto parameters, and a common-name match with the sender certificate. In the event of an error or a failure to meet required security considerations, block 516 provides for alternative dispositions in accordance with options described elsewhere in this specification.

Still referring to FIG. 5, decision block 506 provides for domain-enforced TLS wherein TLS will be required to operate when certain domains are included as recipients in the intended electronic message. If such domain enforcement TLS is invoked, the process moves to block 512 where again the proper TLS format or generation for this situation is confirmed. If not invoked, the process moves to block 508. Decision block 508 is even more specific, providing for content management wherein, for example, if certain terms/content (e.g., nuclear secret, etc.) are used in the message the managing service 302 can require certain levels of encryption. The data in the message is examined for this step, and if such content-based TLS is invoked, the process moves to block 510. Here, block 510 is provided to initiate TLS to take over in a condition in which previous communications had been made, "in the clear" or otherwise at an insufficient level of security. Thus, this block can provide not only for the institution of TLS but also for the heightening of required security levels. Should it be determined at block 508 that encryption is not required, block 518 does provide that the information can be transmitted "in the clear."

Figure 6:
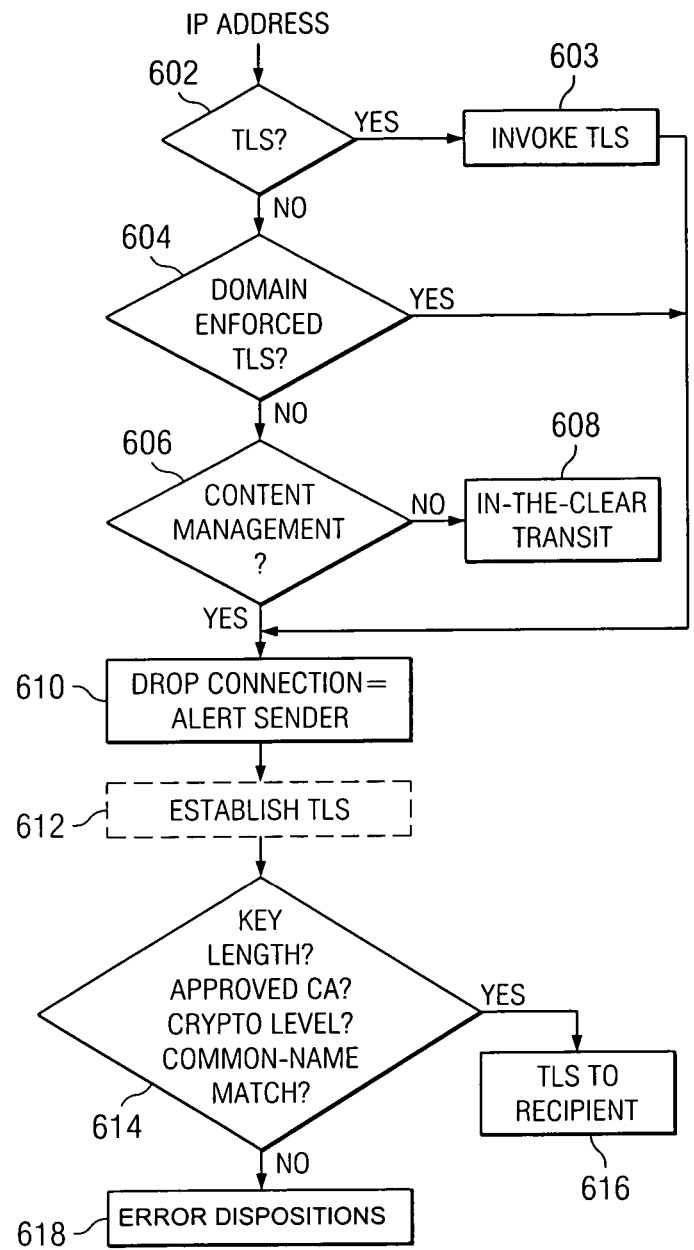
FIG. 6 is an exemplary flow diagram of TLS management according to the teachings of the present disclosure, in which email is "inbound" to a customer's receiving server through a managed email service.

FIG. 6, in contrast to FIG. 5, provides a decision flow diagram 600 for incoming message requests. As described above, the first decision block 602 is put in place to determine if TLS has been invoked according to the IP address of the non-customer server and its possible good or bad reputation as established, among other things, by its association with certain types of undesirable activities as determined by traffic analysis techniques. If TLS is implemented at block 602 according to any concerns based on IP address, block 603 illustrates that "invoking" of TLS. If TLS is not required according to the examination of the incoming IP address at block 602, then decision blocks 604 and 606 are used to determine whether to require TLS encryption based on domain or content, respectively. As discussed above, there are certain domains and/or content that should require greater security measures. Decision blocks 604, and 606 are in place to make those checks. If it is determined that security is not necessary, then communication can continue "in the clear" according to block 408.

For incoming connections such as this, it can be more difficult to manage the establishing of a new encrypted connection. Accordingly, blocks 610 and 612 apply for the dropping of a current SMTP connection and the reestablishing of a new one in accordance with required TLS parameters as set forth in the policy database 308. In reestablishing the SMTP connection, decision block 614 is provided to assure compliance with required policy levels, as set forth in the policy database 308 of the managing service 302. As described above, block 618 is provided for the handling of alternative dispositions if the required security protocol or levels cannot be complied with, else TLS SMTP communications can follow at block 616.

Note that the above description of TLS encryption/security as between servers is a described embodiment, but it should be understood that a "federated encryption" on a per-user basis also is a possible application of the techniques described herein, and the claims should be construed to cover such approaches if they are within the scope of those claims. Specifically, the mail managing service can manage security keys, policies, and authentication information on behalf of individual user subscribers. Through these techniques, the managing service can provide an easily administrative email communication system in which, because of the managing service's position of holding the security keys, security, and compliance policies, it is possible for it to facilitate communication between users having disparate application programs and otherwise provide a very comprehensive security program.

It will also be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for providing transport layer security ("TLS") encryption with a computer server-implemented service located on a first network and interposed in a message path of an electronic message to be sent from a sending server to an intended receiving server located on a second network, wherein the first network is not associated with any gateway associated with the second network, the method comprising:
   identifying, by a computer server, the sending server;
   identifying, by the computer server, the intended receiving server;
   determining at least one security policy, by the computer server, for at least one of the sending and receiving server;
   configuring a first TLS connection, by the computer server, with the sending server in accordance with the at least one determined security policy; and
   configuring, by the computer server, a second TLS connection with the intended receiving server in accordance with the at least one determined security policy while maintaining, by the computer server, the first TLS connection with the sending server.

2. A method according to claim 1, wherein the configuring of the connection with the sending server comprises initiating a TLS-encrypted SMTP connection with the sending server.

3. A method according to claim 1, wherein the configuring of the connection with the sending server comprises refusing a requested SMTP connection from the sending server.

4. A method according to claim 1, wherein the configuring of the connection with the sending server comprises receiving a request to initiate an SMTP connection from the sending server and accepting that connection, and wherein configuring the connection with the intended receiving server comprises initiating an SMTP connection with the intended receiving server while maintaining the SMTP connection with the sending server.

5. A method according to claim 1, wherein the determining of the at least one security policy for the at least one of the sending and intended receiving server comprises identifying a security certificate issued to the at least one of the servers, and wherein identifying the sending and receiving servers comprises verifying the certificates of the servers.

6. A method according to claim 5, wherein the verifying further comprises verifying the certificates of the servers with a plurality of root level Registration Authorities.

7. A method according to claim 5, wherein the verifying further comprises ensuring that the respective certificates have not expired or been revoked.

8. A method according to claim 1, wherein the determining comprises determining at least one security policy established by a user associated with the sending server or the intended receiving server.

9. A method according to claim 1, and further comprising disposing of the received electronic message in accordance with the at least one security policy.

10. A method according to claim 9, wherein the disposing of the received electronic message comprises delivering the electronic message to the intended receiving server via the connection with the intended receiving server.

11. A method according to claim 9, wherein the disposing of the electronic message comprises storing the electronic message at a secure user-accessible website and sending a notification of the storing to the intended receiving server.

12. A method according to claim 9, wherein disposing of the received electronic message comprises at least one selected from the group consisting of:
   message accept;
   message reject;
   message quarantine;
   message redirect; and
   connection rejection.

13. A method according to claim 1, wherein the configuring of the connection with the sending server comprises rerouting a connection request sent from the sending server to the intended receiving server by changing a Domain Name Server entry containing an IP address of the intended receiving server to contain an IP address of an intermediate managed e-mail service.

14. A method according to claim 1, wherein the determined at least one security policy is silent regarding specific user security policies.

15. A method for providing transport layer security ("TLS") encryption with a computer server-implemented service located on a first network and interposed in a message path of an electronic message to be sent from a sending server to an intended receiving server located on a second network, wherein the first network is not associated with any gateway associated with the second network, the method comprising:
   identifying, by a computer server, the sending server;
   identifying, by the computer server, an intended receiving server;
   determining, by the computer server, at least one of a sending user of the sending server and an intended message recipient user of the intended receiving server;
   determining, by the computer server, at least one security policy for at least one of the sending user or intended recipient user;
   configuring, by the computer server, a first TLS connection with the sending server in accordance with the determined at least one determined security policy; and
   configuring, by the computer server, a second TLS connection with the intended receiving server in accordance with the determined at least one security policy while maintaining, by the computer server, the first TLS connection with the sending server.

16. A method according to claim 15, wherein the configuring of the connection with the sending server comprises refusing a requested SMTP connection from the sending server.

17. A method according to claim 15, wherein the configuring of the connection with the sending server comprises receiving a request to initiate an SMTP connection from the sending server and accepting that connection, and wherein configuring the connection with the intended receiving server comprises initiating an SMTP connection with the intended receiving server while maintaining the SMTP connection with the sending server.

18. A method according to claim 15, wherein the determining comprises determining at least one security policy established one of the sending user or intended recipient user.

19. A method according to claim 15, and further comprising disposing of the received electronic message in accordance with the at least one security policy.

20. A method according to claim 19, wherein the disposing of the received electronic message comprises delivering the electronic message to the intended receiving server via the connection with the intended receiving server.

21. A method according to claim 19, wherein the disposing of the electronic message comprises storing the electronic message at a secure user-accessible website and sending a notification of the storing to the intended recipient user.

22. A method according to claim 19, wherein disposing of the received electronic message comprises at least one selected from the group consisting of:
   message accept;
   message reject;
   message quarantine;
   message redirect; and
   connection rejection.

23. A method according to claim 15, wherein the configuring of the connection with the sending server comprises rerouting a connection request sent from the sending server to the intended receiving server by changing a Domain Name Server entry containing an IP address of the intended receiving server to contain an IP address of an intermediate managed e-mail service.

24. A method according to claim 15, wherein the determined at least one security policy is silent regarding specific user security policies.

25. A computer server-implemented mail delivery system located on a first network and interposed in a message path of an electronic message to be sent from a sending server to an intended receiving server located on a second network, wherein the first network is not associated with any gateway associated with the second network, the system comprising:
   a computer server comprising:
      a) a security module operable to establish an encrypted connection with the sending mail server;
      b) a second security module operable to establish and maintain a second encrypted connection with the intended receiving server while the first encrypted connection is maintained with the sending server; and
      c) an email handler operable to perform email management services on the email messages being passed between the first and second security modules; and
   a policy database having policies for servers, domains, and/or users, whereby the security policies of those servers, domains, and/or users can be implemented by the computer server.

26. A system according to claim 25, wherein the connection and security modules are further operable to validate one or more of the servers, domains, and/or users by interfacing with one or more certificate or registration authorities.

* * * * *

UNITED STATES PATENT AND TRADEMARK OFFICE
CERTIFICATE OF CORRECTION

PATENT NO.        : 8,595,814 B2
APPLICATION NO.   : 11/302985
DATED             : November 26, 2013
INVENTOR(S)       : Le et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this
Twelfth Day of May, 2015

Michelle K. Lee
*Director of the United States Patent and Trademark Office*